(12) United States Patent
Meister et al.

(10) Patent No.: US 8,042,867 B2
(45) Date of Patent: Oct. 25, 2011

(54) SEAT PAN DROP DOWN LINK

(75) Inventors: Peter Meister, Weston, FL (US); Larry Hazbun, Miramar, FL (US)

(73) Assignee: B/E Aerospace, Inc., Wellington, FL (US)

( * ) Notice: Subject to any disclaimer, the term of this patent is extended or adjusted under 35 U.S.C. 154(b) by 30 days.

(21) Appl. No.: 12/610,575

(22) Filed: Nov. 2, 2009

(65) Prior Publication Data

US 2011/0101750 A1    May 5, 2011

(51) Int. Cl.
*B60N 2/42* (2006.01)

(52) U.S. Cl. .................. 297/216.15; 297/334; 297/337; 297/284.11; 297/313; 297/344.15

(58) Field of Classification Search ............. 297/216.15, 297/334–338, 284.11, 256.11, 313, 344.15; 248/421

See application file for complete search history.

(56) References Cited

U.S. PATENT DOCUMENTS

| | | | | |
|---|---|---|---|---|
| 3,463,543 A | * | 8/1969 | Zellar | 297/216.2 |
| 3,550,953 A | * | 12/1970 | Neale | 297/312 |
| 4,209,158 A | * | 6/1980 | Pickles | 248/421 |
| 4,296,694 A | * | 10/1981 | Kobayashi | 108/116 |
| 4,589,696 A | * | 5/1986 | Kanai et al. | 297/284.11 |
| 4,636,002 A | * | 1/1987 | Genjiro | 297/319 |
| 4,652,049 A | * | 3/1987 | Maruyama et al. | 297/284.11 |
| 4,671,570 A | * | 6/1987 | Hockenberry et al. | 297/337 |
| 4,687,250 A | | 8/1987 | Esche | |
| 4,709,963 A | | 12/1987 | Uecker et al. | |
| 4,834,333 A | * | 5/1989 | Saito et al. | 248/421 |
| 5,022,707 A | * | 6/1991 | Beauvais et al. | 297/216.2 |
| 6,186,572 B1 | * | 2/2001 | Oh | 296/65.05 |
| 6,334,643 B1 | * | 1/2002 | Lindblad et al. | 296/65.09 |
| 6,386,633 B1 | * | 5/2002 | Newton | 297/284.1 |
| 6,402,244 B1 | * | 6/2002 | Schonenberg et al. | 297/284.11 |
| 6,648,409 B1 | * | 11/2003 | Laporte | 297/216.1 |
| 7,195,316 B2 | | 3/2007 | Shimasaki et al. | |
| 7,780,235 B2 | * | 8/2010 | Teufel et al. | 297/344.15 |

FOREIGN PATENT DOCUMENTS

| | | | | |
|---|---|---|---|---|
| FR | 2562003 A1 | * | 10/1985 | |
| JP | 56039927 A | * | 4/1981 | |
| JP | 57058523 A | * | 4/1982 | |
| JP | 57151439 A | * | 9/1982 | |
| JP | 61295141 A | * | 12/1986 | |
| JP | 05115331 A | * | 5/1993 | |

* cited by examiner

*Primary Examiner* — Laurie Cranmer

(74) *Attorney, Agent, or Firm* — Drinker Biddle & Reath LLP

(57) ABSTRACT

A chair having an adjustable seat pan is disclosed. The chair includes a seat frame having a front end and a rear end, a seat back attached to the rear end of the seat frame, a seat pan pivotally connected to the seat frame, and a seat drop down link having a first end attached to the seat frame and a second end in contact with a catch member located beneath the seat pan so that the seat pan can be raised and lowered from a flat position to approximately a 6° angle with respect to the seat frame.

9 Claims, 4 Drawing Sheets

SEAT PAN DROP DOWN LINK

FIELD OF THE INVENTION

This invention pertains to a vehicle seat in general and, more particularly, to a passenger seat used in an aircraft.

BACKGROUND OF THE INVENTION

Traditional seats were designed so that the seating portion of the seat was at a right angle to the backrest. These seats, however, proved to be uncomfortable to sit in during long trips or flights. In an effort to improve the comfort level of seats, manufactures have tried various designs including increased padding in the seat and backrests as well as installing lumbar cushions in the lower portion of the back rest in an attempt to relieve pressure in the lower back of the seat occupant.

Another way of making seating more comfortable was to incline the seat with respect to the backrest. The inclination of the seat by approximately 2-6° allows the weight of the occupant to be transferred toward the intersection of the seat bottom with the back rest. This reduces the fatigue on the gluteus maximus that results from sitting directly on one's bottom for extended periods of time.

Although the angling of the seat bottom with respect to the back rest provides for greater comfort over an extended period of time, such an arrangement is not always possible or practicable. For example, in an aircraft passenger seat the seat bottom or pad is angled at between 2-6° for taxi, take-off, and landing (TTOL). The seat could remain at this angle throughout the flight, however, should one attempt to work at a desk or tray table, or eat sitting at this angle they would have to move up to the edge of the seat or lean forward so as to be able to write or avoid dropping food down the front of themselves. This type of seating is not necessarily desirable, particularly for executive style seating on private or VIP aircraft.

It would be much easier and comfortable to work or eat in a chair in which the seat bottom was flat, as opposed to being oriented at approximately a 2-6° angle. For this reason, a seat having a drop down seat pan for which the position could be either flat or angled approximately 2-6° from the horizontal would be an important improvement in the art.

SUMMARY

The invention involves a chair having an adjustable seat pan. The chair is comprised of a seat frame having a front end and a rear end. A seat back is attached to the rear end of the seat frame and a seat pan is pivotally connected to the back of the seat frame. A seat drop down link having a first end attached proximal to the front of the seat pan and a second end in contact with a catch member located beneath the seat pan.

BRIEF DESCRIPTION OF THE DRAWINGS

The above-noted and other advantages of the invention will be apparent from the description of the invention provided herein with reference to the attached drawings in which.

DETAILED DESCRIPTION OF THE EMBODIMENTS

Figure 1:
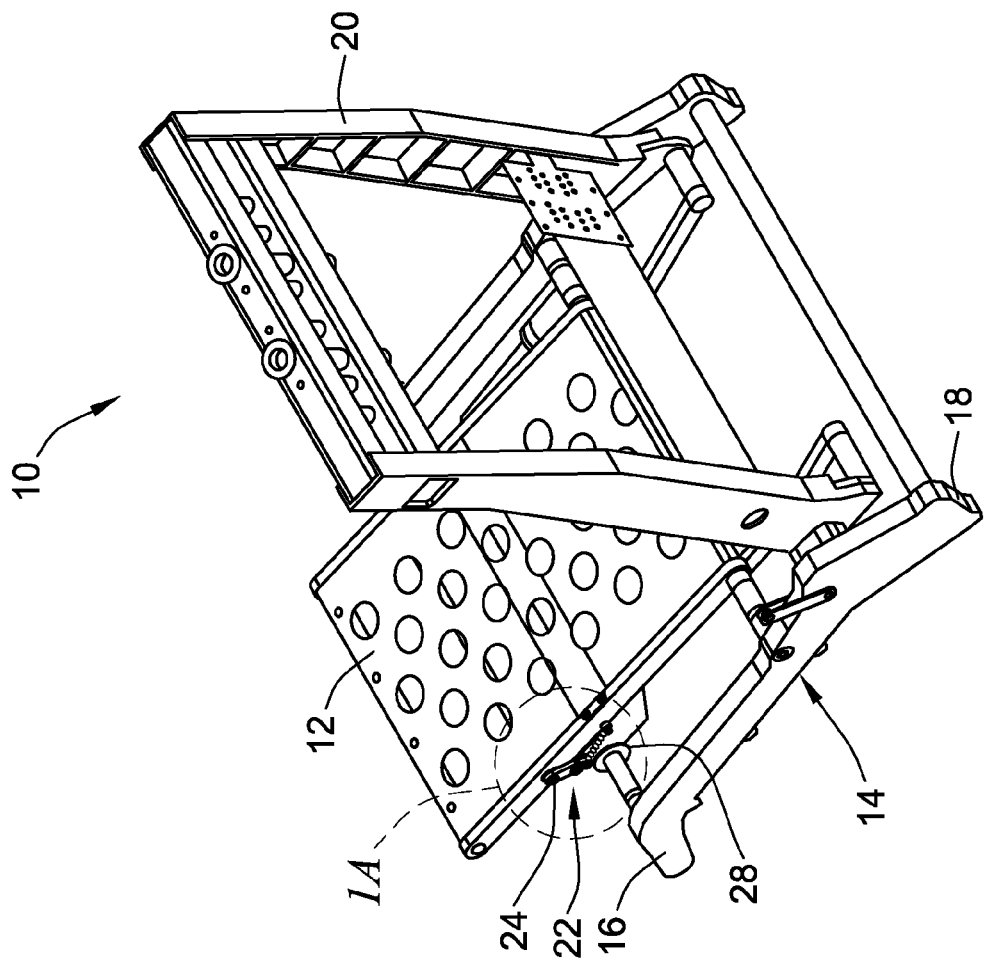
FIG. 1 is a perspective view of a chair having an adjustable seat pan.

A chair 10 having an adjustable seat pan 12 is disclosed. The chair 10, as shown in FIG. 1, is comprised of a seat frame 14 having a front end 16 and a rear end 18. A seat back 20 is attached to the rear end 18 of the seat frame 14 and a seat pan 12 is pivotally connected to the seat frame 14. A seat drop down link 22 having a first end 24 attached to the seat pan 12 and at a second end 26 (best seen in FIG. 2) in contact with a with a catch member 28 that is located beneath the seat pan 12.

Figure 2:
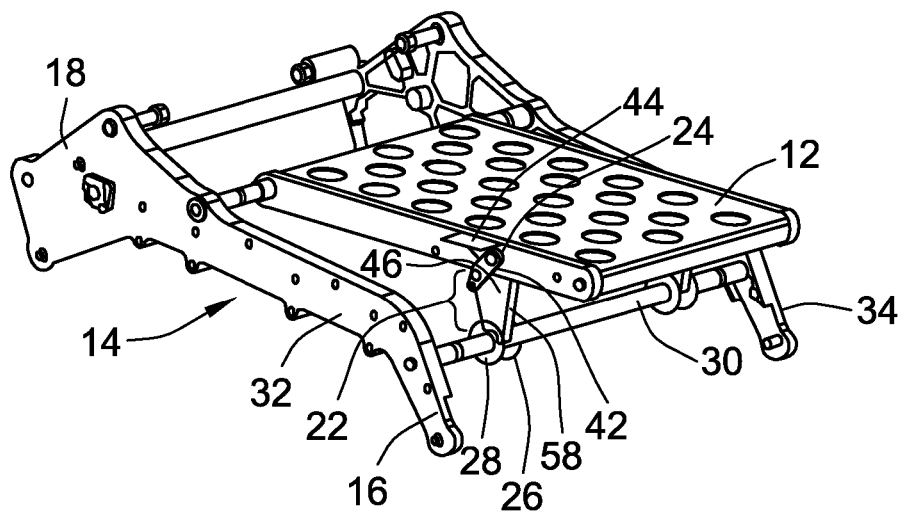
FIG. 2 is a perspective view showing the seat pan in a raised position with the first receiving catch portion engaged with the catch member.

In an embodiment, the catch member 28 is a transverse support member 30 connecting a first and a second side rail 32, 34 of the seat frame 12 to one another, In a more particular embodiment, as shown in FIG. 2, the catch member 28 is a spool encircling the transverse support member 30. The spool may be manufactured of plastic-like material or any other suitable material without departing from the spirit and scope of the invention.

Figure 1A:
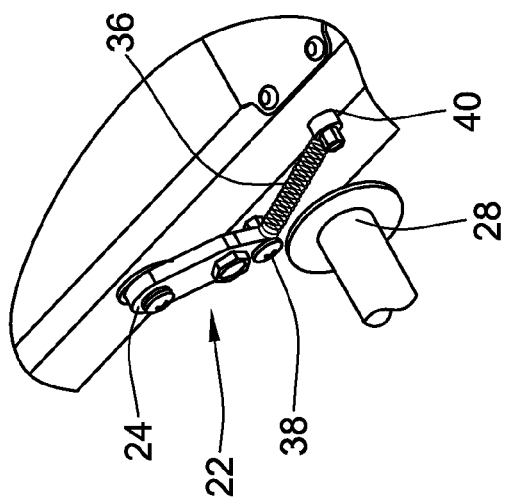
FIG. 1(a) is a perspective view of the drop-down link showing the activation component without the activation lever.

In another embodiment, the drop-down link 22 is biased with a spring 36 having a first end 38 attached to the drop-down link 22 and a second end 40 attached to the seat pan 12, as shown in FIG. 1(a).

Figure 4:
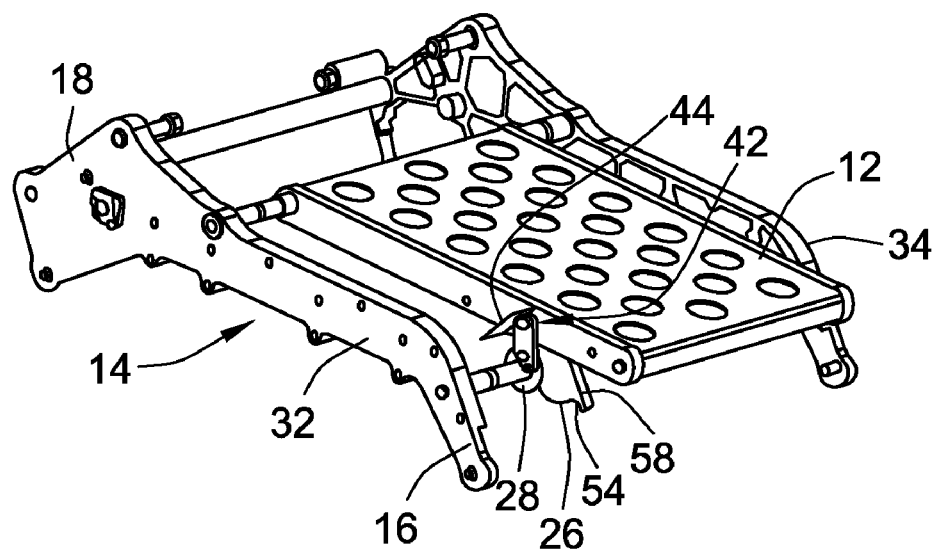
FIG. 4 is a perspective view showing the seat pan in a flat or lowered position with the second catch receiving portion of the drop down link engaged with the catch member.
Figure 5:
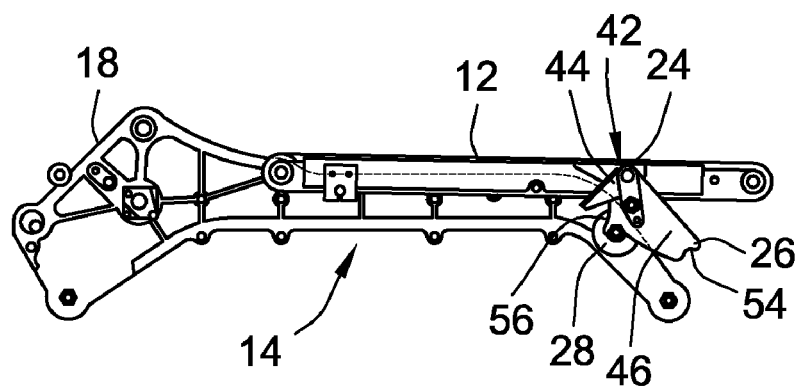
FIG. 5 is a side view showing the seat pan in a flat or lowered position with the second catch receiving portion of the drop down link engaged with the catch member.
Figure 6:
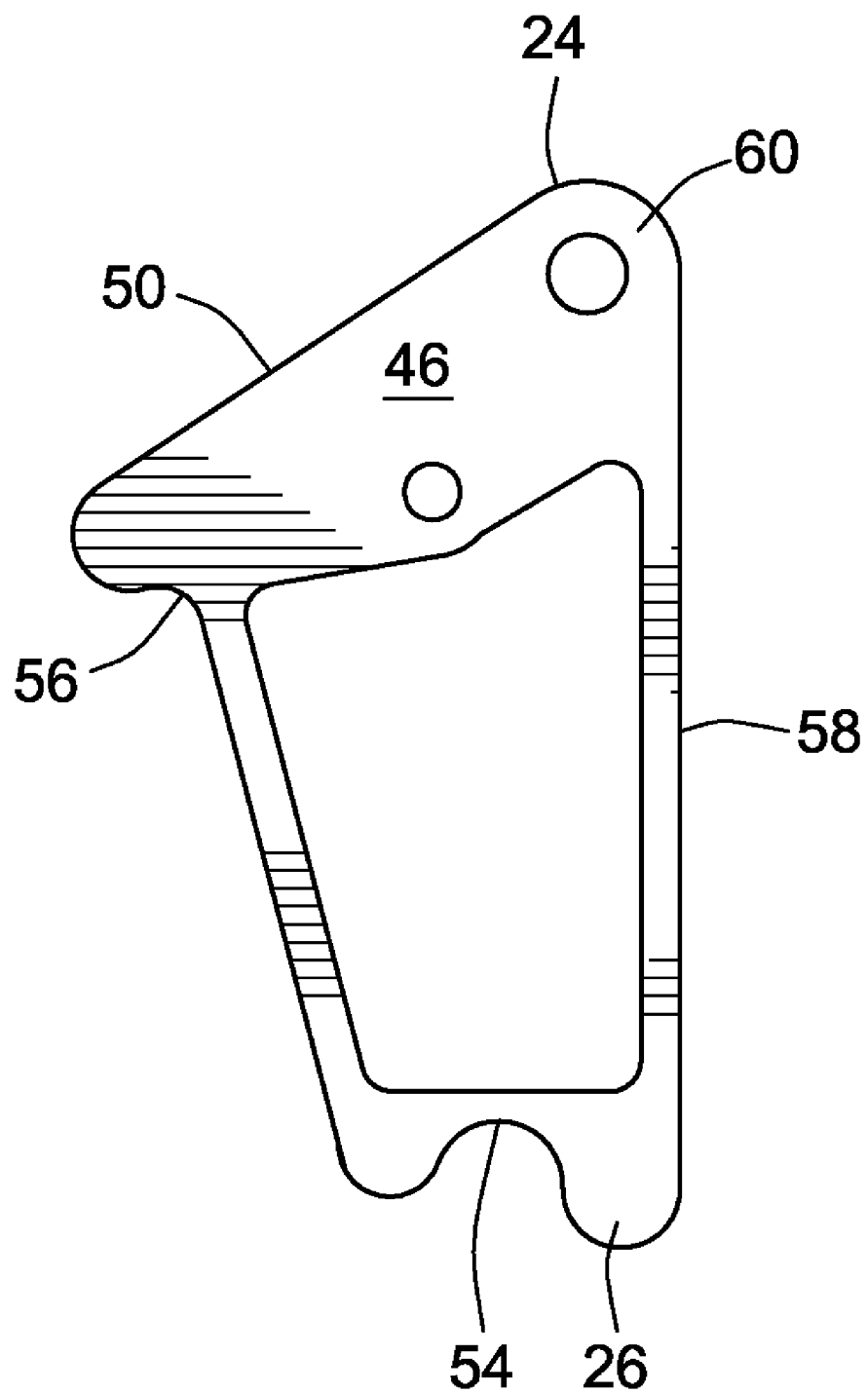
FIG. 6 is front view of the catch-receiving component of the drop-down link.

As shown in FIGS. 2-5, the drop-down link 22 is comprised of an activation component 42 attached outboard of the seat pan 12. The activation component 42 includes an activation lever 44. A catch-receiving component 46 is positioned inboard of the seat pan 12 and is connected to the activation component 42. As shown in FIG. 6, the catch-receiving component 46 includes a first end 24 that is pivotally attached to the seat pan 12. This first end 24 includes an upper edge 50. A second end 26 having a first catch-receiving portion 54, and a second catch-receiving portion 56 that is proximal to the first end 24 are also part of the catch-receiving component 46.

Figure 3:
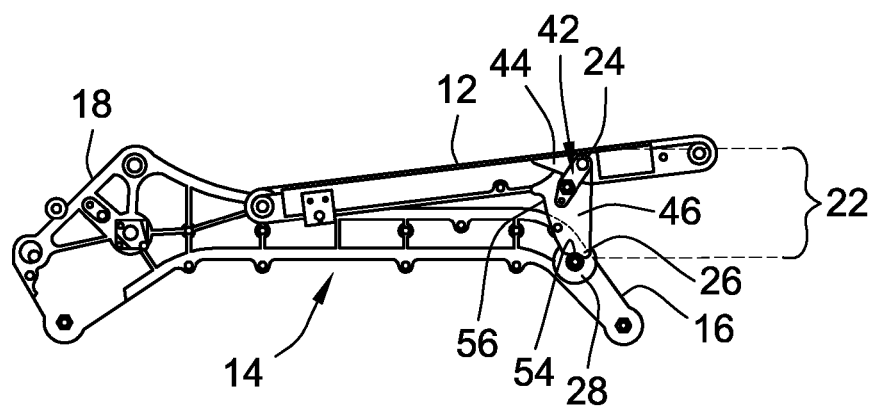
FIG. 3 is a side view showing the seat pan in a raised position and the first catch receiving portion engaged with the catch member.

In an embodiment, as shown in FIG. 6, the catch-receiving component 46 of the drop-down link 22 has a front edge 58 that forms approximately a 45° angle with the upper edge 50. When the seat pan 12 is angled approximately 6° with respect to the seat frame 14, the first catch-receiving portion 54 is located approximately opposite a vertex 60 formed by the intersection of the upper edge 50 and the front edge 58, as shown in FIGS. 2 and 3. The vertex 60 of the intersection of the upper edge 50 and the front edge 58 of the catch-receiving component 46 may also form a pivot point about which the drop-down link 22 rotates.

In an embodiment, as shown in FIGS. 2 and 3, the front edge 58 of the catch-receiving component 46 of the drop down link 22 is substantially perpendicular to the activation lever 44 when the first catch-receiving portion 54 is in contact with the catch member 28 and the seat pan 12 is angled approximately 6°. In yet another embodiment, as shown in FIGS. 4 and 5, the second catch-receiving portion 56 is opposite the vertex 60 of the upper edge 50 and the front edge 58 when the second catch-receiving portion 56 is in contact with the catch member 28, thereby aligning the seat pan 12 with the seat frame 14.

When in operation, the seat pan 12 is inclined at approximately a 2-6° angle for taxi, takeoff, and landing, as shown in FIGS. 2 and 3. Once in flight, however, the occupant may desire to sit in a more upright position in order to eat, write, or converse with another passenger. In order to change the position of the seat pan 12, the occupant applies pressure to the activation lever 44 connected to the activation component 42 of drop down link 22. This pressure disengages the first catch-receiving portion 54 of the link 22 from the catch member 28 causing the catch-receiving component 46 of the drop down link 22 to rotate about the pivot point and follow along the catch member 28 until the second catch receiving portion 56 contacts the catch member 28, as shown in FIG. 5. In order to reposition the seat pan 12 for taxi, takeoff, or landing the occupant merely reverses the procedure by pulling on the activation lever 44, thereby causing the catch-receiving component 46 to slide up along the catch member 28 until the first catch-receiving portion 54 contacts the catch member 28 at which time the seat pan 12 is once again be positioned at approximately a 6° angle with respect to the seat frame 14.

Although a seat angle of approximately 2-6° is described, various angles greater or less than those described could be achieved by adjusting the size of the drop down link 22.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A chair comprising:
a seat frame having a front end and a rear end;
a seat back attached to the rear end of the seat frame;
a seat pan pivotally connected to the seat frame; and
a seat drop-down link having a first end attached to the seat pan and a second end in contact with a catch member located beneath the seat pan, the drop-down link including:
a catch receiving component connected to an activation attached outboard of the seat pan, said activation component including an activation lever component, said catch receiving component positioned inboard of the seat pan and including:
a first end pivotally attached to the seat pan, said first end including an upper edge;
a second end having a first catch receiving portion; and
a second catch receiving portion proximal to the first end.

2. The chair of claim 1, wherein the catch member is a transverse support member connecting a first and a second side rail of the seat frame to one another.

3. The chair of claim 2, wherein the catch member is a spool encircling the transverse support member.

4. The chair of claim 3, wherein the spool is manufactured of plastic-like material.

5. The chair of claim 1 further comprising a spring having a first end attached to the drop down link and a second end attached to the seat pan.

6. The chair of claim 1, wherein:
the catch receiving component of the drop-down link has a front edge;
the upper edge forms approximately a 45° angle with the front edge; and
the first catch receiving portion is approximately opposite a vertex formed by the intersection of the upper edge and the front edge when the seat pan is angled approximately 6° with respect to the seat frame.

7. The chair of claim 6, wherein the front edge of the drop down link is substantially perpendicular to the activation lever when the first catch receiving portion is in contact with the catch member, thereby aligning the seat pan at approximately a 6° angle with respect to the seat frame.

8. The chair of claim 6, wherein the second catch receiving portion is opposite the vertex of the upper edge and the front edge when the second catch receiving portion is in contact with the catch member, thereby aligning the seat pan with the seat frame.

9. The chair of claim 1, wherein the vertex of the intersection of the upper edge and the front edge of the catch receiving component forms a pivot point about which the drop-down link rotates.

* * * * *